(12) United States Patent
Galat et al.

(10) Patent No.: US 10,889,344 B2
(45) Date of Patent: Jan. 12, 2021

(54) TRACK ASSEMBLY FOR A MACHINE

(71) Applicant: Caterpillar Inc., Deerfield, IL (US)

(72) Inventors: Michael S. Galat, Peoria, IL (US);
Temitope O. Akinlua, Peoria, IL (US);
Kevin L. Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 15/996,977

(22) Filed: Jun. 4, 2018

(65) Prior Publication Data
US 2019/0367110 A1 Dec. 5, 2019

(51) Int. Cl.
*B62D 55/21* (2006.01)
*B62D 55/32* (2006.01)

(52) U.S. Cl.
CPC ............. *B62D 55/21* (2013.01); *B62D 55/32* (2013.01)

(58) Field of Classification Search
CPC ................................. B62D 55/21; B62D 55/32
See application file for complete search history.

(56) References Cited

U.S. PATENT DOCUMENTS

| | | | | |
|---|---|---|---|---|
| 1,651,832 A | * | 12/1927 | Morse | F16G 13/04 474/216 |
| 3,049,933 A | * | 8/1962 | Besel | F16G 5/18 474/8 |
| 4,324,437 A | | 4/1982 | Narang | |
| 5,183,318 A | | 2/1993 | Taft | |
| 5,711,586 A | | 1/1998 | Anderton et al. | |
| 6,059,097 A | * | 5/2000 | Clopton | B65G 17/065 198/852 |
| 6,485,116 B1 | | 11/2002 | Oertley | |
| 7,438,179 B2 | * | 10/2008 | Gundlach | B65G 17/40 198/853 |
| 8,562,081 B2 | | 10/2013 | Sturmon | |
| 8,613,486 B2 | | 12/2013 | Johannsen et al. | |
| 9,475,526 B2 | | 10/2016 | McKinley et al. | |
| 2009/0230763 A1 | * | 9/2009 | Sakai | B62D 55/28 305/202 |
| 2010/0102624 A1 | * | 4/2010 | Mulligan | B62D 55/21 305/195 |
| 2017/0021879 A1 | | 1/2017 | Thorson et al. | |
| 2017/0129555 A1 | | 5/2017 | Johannsen | |

FOREIGN PATENT DOCUMENTS

| | | |
|---|---|---|
| EP | 1155945 B1 | 11/2005 |
| GB | 833547 A | 4/1960 |
| JP | 2003127919 A | 5/2003 |

* cited by examiner

*Primary Examiner* — Kip T Kotter
(74) *Attorney, Agent, or Firm* — Bookoff McAndrews

(57) ABSTRACT

A track link assembly includes a plurality of link subassemblies including a first link subassembly and a second link subassembly. Each link subassembly includes a pair of links coupled together. Each link includes a first aperture and a second aperture, and the second aperture of each link is C-shaped. The track link assembly also includes a pin element pivotably coupling each of the first link subassembly and the second link subassembly. The pin element includes a centrally positioned central portion and end portions on opposite sides of the central portion. The central portion of the pin element is configured to pass through the first aperture of a first link in each of the first link subassembly and the second link subassembly, and the end portions are configured to pass through the second apertures of a second link in each of the first link subassembly and the second link subassembly.

20 Claims, 4 Drawing Sheets

TRACK ASSEMBLY FOR A MACHINE

TECHNICAL FIELD

The present disclosure relates generally to a track assembly for a machine, and more particularly, to a coupling arrangement for adjacent track links for a machine.

BACKGROUND

Track type machines typically utilize track chains on each side of the machine to engage the ground surface to propel the machine. Individual links that form the track chains are connected to ground engaging elements, known as track shoes, to move the machine. A sprocket, driven by an engine of the machine, engages and translates the track chain about spaced apart pulley mechanisms. As the track chain translates, the connected track shoes engage a ground surface under the machine and propel the machine on the ground surface. The track chains are made of link assemblies coupled together. Track chains can be broadly classified as straight link chains and offset link chains. Straight link chains have alternate inner and outer links that are coupled together while, in an offset link chain, all the links are alike. Regardless of the type of track chain, the links that comprise the track chain often then require grease or oil as a lubricant between the rotating components (i.e., the pin and the bushing) to prevent galling and extend the usable lifetime of the track chain. Still, these track chains wear over time and may need to be replaced or serviced. As such, costs of production and maintenance are often important considerations in the manufacture and assembly of the track chain.

An exemplary track chain is disclosed in U.S. Pat. No. 4,324,437 ("the '437 patent") issued to Narang. The '437 patent discloses a link assembly that includes reversible track links that are connected by sealed pivot assemblies. The pivot assemblies include replaceable hardened wear inserts at points of increased fatigue. While the link assembly of the '437 may be suitable for some applications, it may not be suitable for other applications. The disclosed link assembly and arrangement may solve one or more of the problems set forth above and/or other problems in the art. The scope of the current disclosure, however, is defined by the attached claims, and not by the ability to solve any specific problem.

SUMMARY

In one aspect, a track link assembly may include a plurality of link subassemblies including a first link subassembly and a second link subassembly. Each link subassembly may include a pair of links coupled together. Each link may include a first aperture and a second aperture, and the second aperture of each link may be C-shaped. The track link assembly also may include a pin element pivotably coupling each of the first link subassembly and the second link subassembly. The pin element may include a centrally positioned central portion and end portions on opposite sides of the central portion. The central portion of the pin element may be configured to pass through the first aperture of a first link in each of the first link subassembly and the second link subassembly, and the end portions may be configured to pass through the second apertures of a second link in each of the first link subassembly and the second link subassembly.

The central portion may be substantially cylindrical. The first apertures may be substantially circular, and a cross-sectional diameter of the first apertures may be smaller than a cross-sectional diameter of the central portion. The central portion may be interference or press fit within the corresponding first aperture. The end portion of each link may be slip fit within the corresponding second aperture, and each second aperture may include a protrusion extending toward the end portion. The protrusion may form a rocker arm. The end portion of each link may include an indented portion configured to contact and at least partially receive the protrusion. During relative rotation of links in each of the first link subassembly and the second link subassembly, the protrusion may pivot within the indented portion. The second aperture may allow for relative pivoting between the pin element and the link through which the end portion extends of between approximately 15-30 degrees in a clockwise direction and between approximately 15-30 degrees in a counter clockwise direction. The pin element may be a single element formed of heat treated steel. Each of the links of each link subassembly may be coupled in an offset configuration. Each of the links may include one or more central holes positioned between the first aperture and the second aperture, and each of the links may include one or more shoe holes configured to couple one or more track shoes to each link.

In another aspect, a track link may include a first aperture and a second aperture. The first aperture and the second aperture may be spaced apart along a longitudinal axis of the track link, and the second aperture may be C-shaped.

The first aperture may be circular. The second aperture may include a semicircular portion and two open portions formed by curved surfaces to form the C-shaped aperture. The track link may further include a protrusion positioned between the two open portions and extending toward the semicircular portion of the second aperture. The track link may further include one or more central holes positioned between the first aperture and the second aperture. The track link may also further include one or more shoe holes configured to couple one or more track shoes to the track link.

In another aspect, a track link component may include a track link pin. The track link pin may be an integrally formed piece of metal and may include a centrally-positioned central portion and two end portions on opposite sides of the central portion. The central portion may be cylindrical, and each of the end portions may include a C-shaped extension extending longitudinally from the central portion.

The track link pin may be formed of heat treated steel. The track link pin may include a ledge portion extending longitudinally between the central portion and each of the one end portions. The C-shaped extensions may include a semicircular outer face and an indented inner face. The inner face may include a top extension and a bottom extension portion connected by an indented portion.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of material that is traversed (e.g., dirt, rocks, clay, sand, asphalt, cement, etc.). Moreover, in this disclosure, relative terms, such as, for example, "about," "substantially," and "approximately" are used to indicate a possible variation of ±10% in the stated value.

Figure 1:
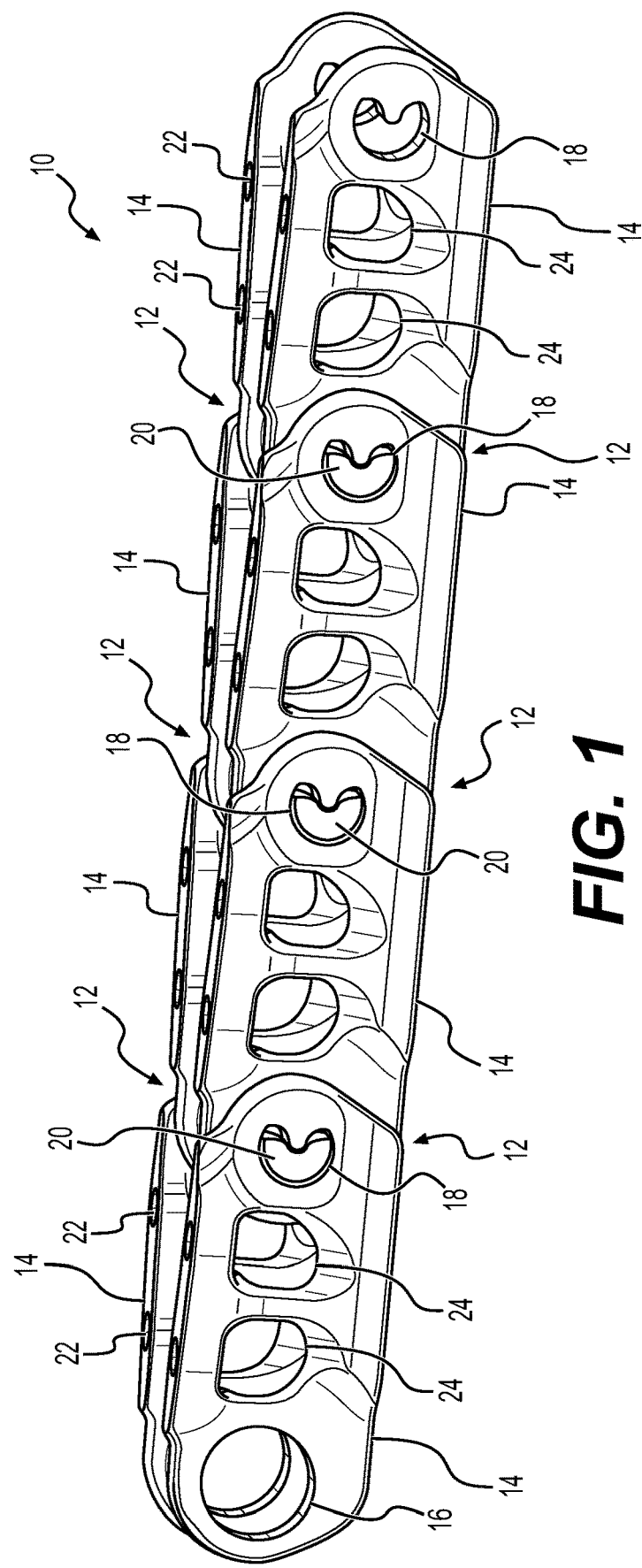
FIG. 1 is a perspective view of a portion of an exemplary track link assembly.

FIG. 1 illustrates a perspective view of a portion of an exemplary track link assembly 10, according to the present disclosure. Track link assembly 10 may be coupled to any mobile machine that performs some type of operation with an industry such as mining, construction, farming, transportation, or any other industry known in the art. For example, track link assembly 10 may be coupled to an undercarriage assembly and driven by a power source of an excavator, a dozer, a loader, a backhoe, a motor grader, or any other earth moving machine. A separate track assembly 10 may be coupled to each side of the machine and form separate endless loops. Although not shown, a plurality of track shoes may be coupled to an outer surface of track link assembly 10 in order to aid in the engagement of a ground surface.

Figure 2:
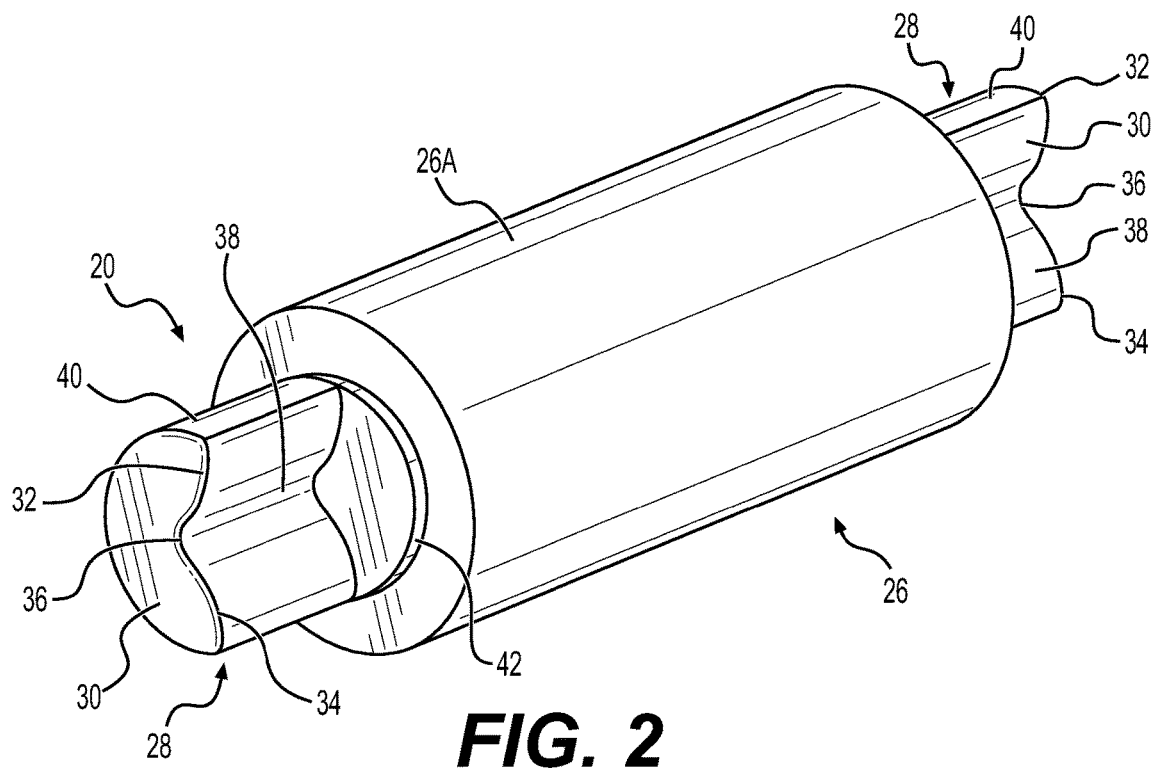
FIG. 2 is a perspective view of an exemplary coupling element of the track link assembly of FIG. 1.
Figure 4:
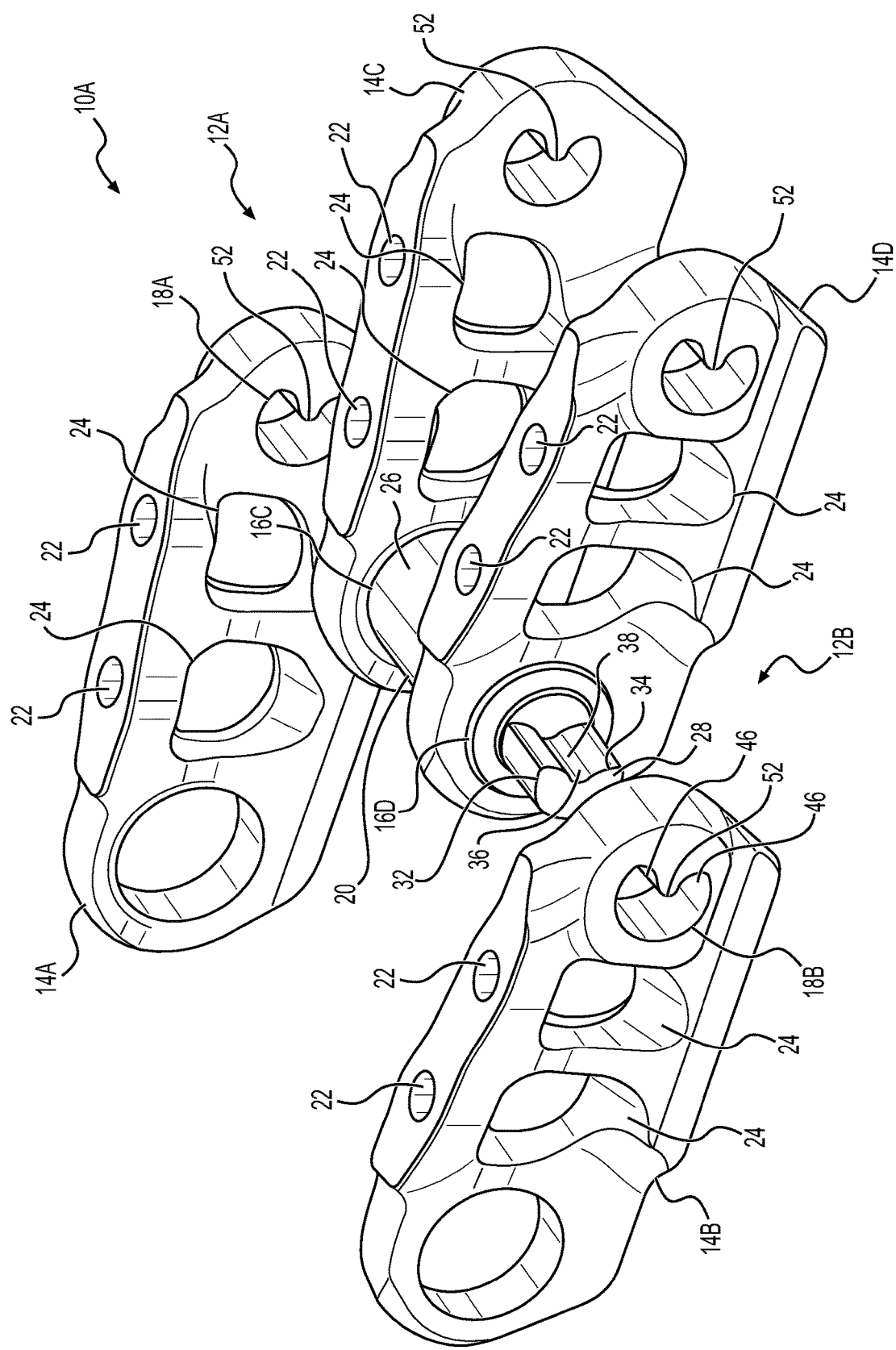
FIG. 4 is a partially exploded view of the track link assembly of FIG. 1.

As shown in FIG. 1, track link assembly 10 may be an offset link chain that includes multiple structurally similar link subassemblies 12 that each include a pair of laterally spaced apart and offset links 14. Each link 14 includes apertures (first aperture 16 and second aperture 18) at respective opposite ends and/or spaced apart along a longitudinal axis of each link 14. A first pair of links 14 may form a portion of one side of track link assembly 10, and a second pair of links may form a portion of the other side of track link assembly 10. Individual subassemblies 12 of links 14 are coupled by a pin 20 (FIG. 2). Each pin 20 may extend though portions of adjacent, laterally spaced apart pairs of links 14 in order to rotatably couple adjacent pairs of links 14. For example, pin 20 may pass through first apertures 16 of two forward links 14 and through second aperture 18 of two rear links 14 to connect two link subassemblies 12 (FIG. 4). A plurality of link subassemblies 12 may be coupled together to form track link assembly 10. Additionally, although not shown, track link assembly 10 may include a master link assembly that couples two free ends of the chain to form an endless track chain (i.e., a chain that forms an endless loop).

Links 14 may include a plurality of shoe holes 22, for example, on a top/outer surface of links 14 in order for the track shoes (not shown) to be coupled to links 14. Shoe holes 22 may extend as through-holes to central holes 24, for receiving a bolt and nut assembly to secure the track shoes to links 14. Central holes 24 may be positioned between first aperture 16 and second aperture 18 on each link 14. Additionally, central holes 24 may help to reduce the amount of material necessary to form each link 14 without substantially impacting the structural characteristics of each link 14.

Figure 5:
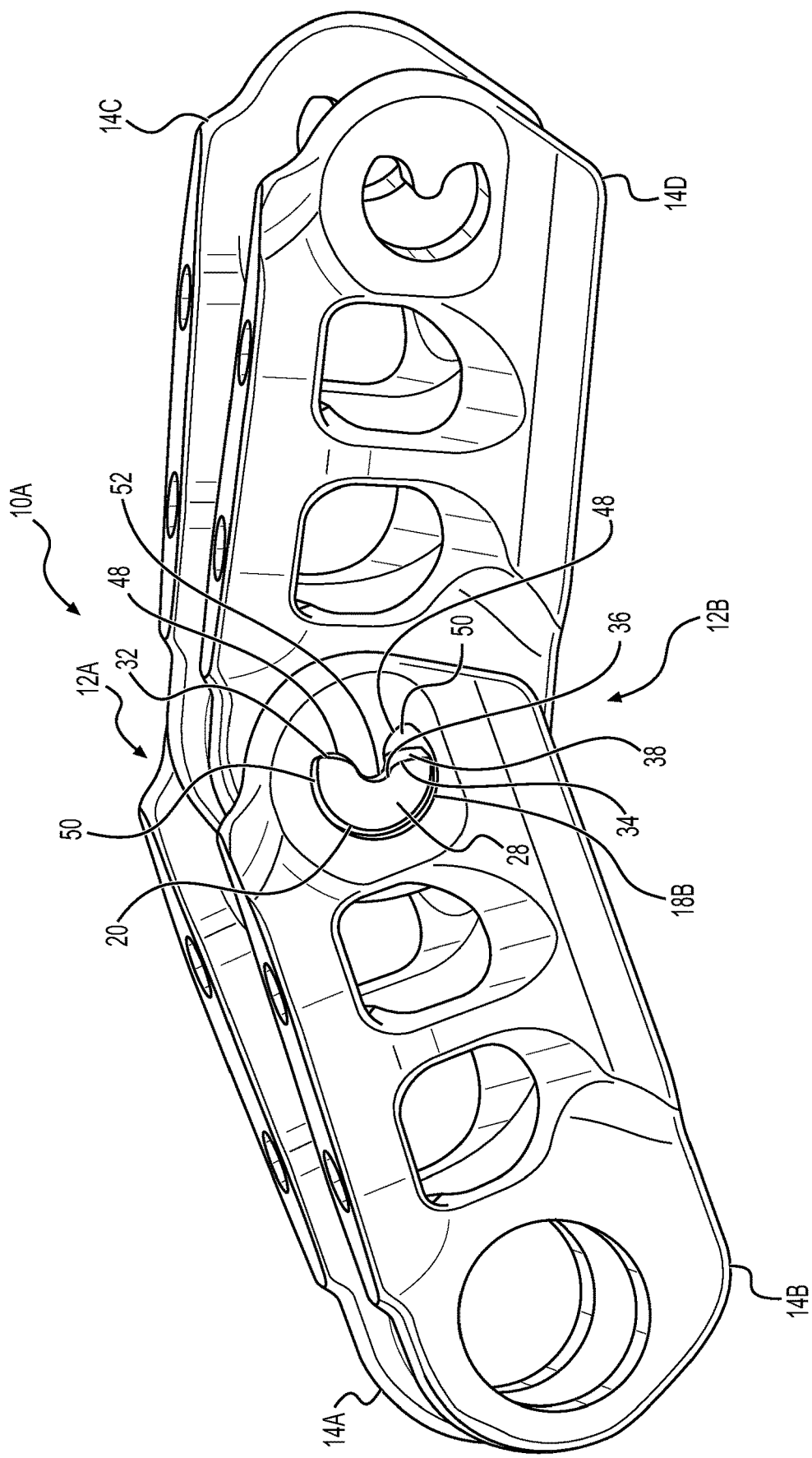
FIG. 5 is a perspective view of a portion of the exemplary track link assembly in another configuration.

FIG. 2 illustrates an individual coupling element or pin 20. As shown, pin 20 includes a central portion 26 and end portions 28 on opposite sides of central portion 26. Central portion 26 may be substantially cylindrical with a first diameter and a central face 26A. A largest diameter of end portions 28 is smaller than the first diameter of central portion 26. Additionally, in one aspect, end portions 28 form extensions 30, each of which include a top extension portion 32 and a bottom extension portion 34 connected by an indented portion 36 on an inner face 38 of end portion 28. Top extension portion 32 and bottom extension portion 34 may be curved (e.g., convex) with respect to a position in front of the extensions 32, 34. Indented portion 36 may also be curved (e.g., concave) with respect to a position in front of the indented portion 36. End portion 28 also includes an outer face 40, which may be substantially semicircular. As such, extensions 30 on end portions 28 may be substantially C-shaped and extend longitudinally from central portion 26. As used herein, C-shaped includes any shape that includes opposing portions (e.g. top and bottom extension portions 32, 34) that extend beyond a middle portion (e.g. indented portion 36) located between the opposing portions. The opposing and middle portions may include a curved surface and/or a flat surface. For example, a shape having surfaces forming a sideways V-shape is included in the definition of C-shaped herein. As shown in FIGS. 1, 4, and 5, extensions 30 are smaller than and substantially complementary to second apertures 18, which helps to allow relative rotation or pivoting of pin 20 and the link 14 through which the pin 20 extends.

Pin 20 may also include a ledge portion 42 extending longitudinally between central portion 26 and each end portion 28, which may help space links 14 apart when coupled via pin 20. Pin 20 may be formed of as a single, unitary piece, and may be formed of steel or another appropriate material. Each pin 20 may also be heat treated.

Figure 3:
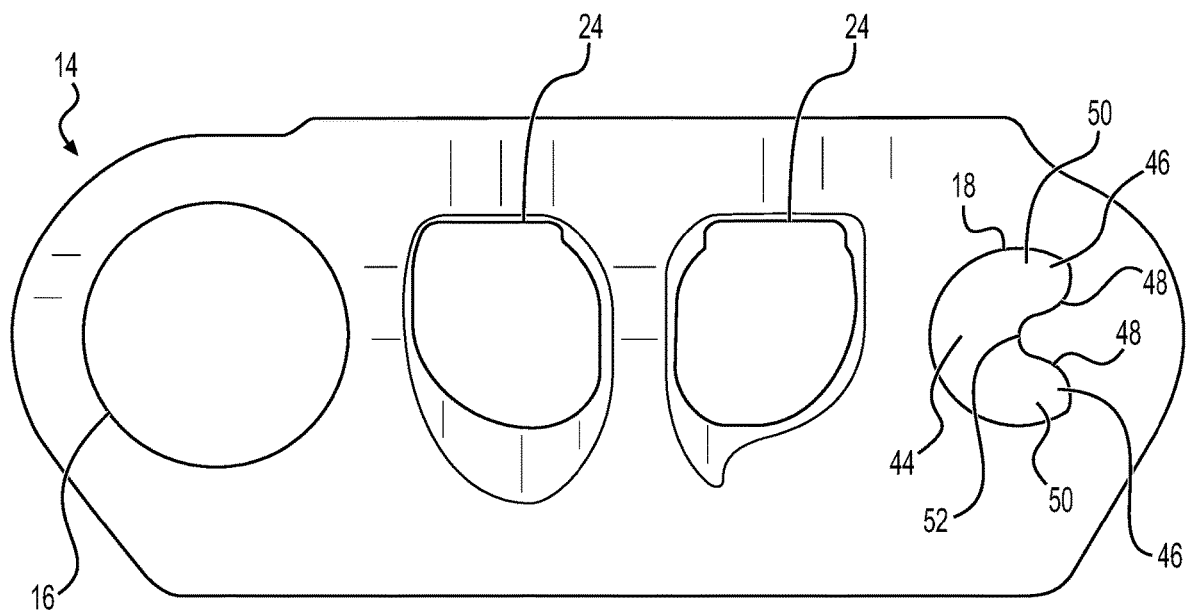
FIG. 3 is a side view of an exemplary link of the track link assembly of FIG. 1.

FIG. 3 illustrates a side view of one link 14. As discussed above, each link 14 may include one first aperture 16, one second aperture 18, and central holes 24. First aperture 16 may be substantially cylindrical, and may be sized to receive a portion of central portion 26 of one pin 20. In one aspect, first aperture 16 may be sized to receive central face 26A of central portion 26 in an interference fit or a press fit. For example, first aperture 16 may include a diameter slightly smaller than a corresponding diameter of central portion 26, which may help facilitate the interference fit or press fit. As such, when one pin 20 and one link 14 are coupled with central portion 26 positioned in first aperture 16, pin 20 and link 14 are fixed or otherwise stationary relative to each other.

Second aperture 18 of link 14 may be substantially C-shaped to receive a portion of end portion 28 of one pin 20. In one aspect, second aperture 18 includes an opening portion 44 that may be semicircular, and two tip portions 46 that include a surface portion 48 and an area portion 50. Surface portions 48 may be curved, for example, substantially concave and including a curvature that is open toward opening portion 44. Area portions 50 may be rounded openings that extend between surface portions 48 and into opening portion 44. For example, the shape of area portions 50 may be complementary to surface portions 48.

Tip portions 46 may be separated by a rocker arm or protrusion 52 that extends toward semicircular opening portion 44. Second aperture 18 may be sized to receive end portion 28 in a slip fit arrangement, with end portion 28 being pivotably movable within second aperture 18. For example, indented portion 36 may include a shape corresponding to protrusion 52 such that protrusion 52 forms a pivot around which link 14 and pin 20 may pivot relative to each other. Tip portions 46 of second aperture 18 may be sized to allow top extension portion 32 and bottom extension portion 34 of end portion 28 to move within respective tip portions 46 to allow relative pivoting between link 14 and pin 20. For example, top extension portion 32 may pivot toward a first surface portion 48 (e.g., surface portion 48 above protrusion 52 in FIG. 3), and bottom extension portion 34 may pivot away from a second surface portion 48 (e.g., surface portion 48 below protrusion 52 in FIG. 3). In a similar manner, top extension portion 32 may pivot away from the first surface portion 48 (e.g., surface portion 48 above protrusion 52 in FIG. 3), and bottom extension portion 34 may pivot toward the second surface portion 48 (e.g., surface portion 48 below protrusion 52 in FIG. 3). As such, second aperture 18 may allow relative pivoting or rotation between pin 20 and one or more links 14. In one aspect, tip portions 46 may be sized to allow pivoting of the pin 20 relative to the link(s) 14 up to between 15 and 30 degrees in a clockwise direction and up to between 15 and 30 degrees in a counter clockwise direction. Accordingly, one pin 20 may be coupled to a first link 14 via central portion 26 through first aperture 16 of the first link 14. The same pin 20 may be coupled to a second link 14 via end portion 28 through second aperture 18, such that first and second links 14 are pivotable relative to each other with at least a portion of inner face 38 of end portion 28 contacting protrusion 52 of link 14 (FIG. 5).

FIG. 4 illustrates a partially exploded view of several links 14 coupled together to form a track link assembly portion 10A. Two link subassemblies 12 (e.g., a right side subassembly 12A and a left side subassembly 12B, each including a pair of laterally spaced apart and offset links 14) may be coupled via pin 20 to form track link assembly portion 10A. For example, right side subassembly 12A includes a first forward link 14A and a first rear link 14C, and left side subassembly 12B includes a second forward link 14B and a second rear link 14D. The two link subassemblies 12 are coupled via pin 20 such that first forward link 14A, second forward link 14B, first rear link 14C, and second rear link 14D are coupled to each other. Each link 14A-14D of link subassemblies 12 includes one first aperture 16, one second aperture 18, and respective shoe holes 22 and central holes 24.

First forward link 14A, second forward link 14B, first rear link 14C, and second rear link 14D are coupled via one pin 20. As shown, central portion 26 of pin 20 extends through first apertures 16C and 16D of first rear link 14C and second rear link 14D. In one aspect, pin 20 is fixedly coupled to first rear link 14C and second rear link 14D, for example by an interference or press fit. While first apertures 16 and central portion 26 are shown with substantially circular cross-sections, this disclosure is not so limited, as first apertures 16 and central portions 26 of track link assembly 10 may be any appropriate shape, including, for example, ovular, rectangular, triangular, etc. Additionally, although only one end portion 28 is shown in FIG. 4, end portions 28 of pin 20 extend through respective second apertures 18A and 18B of first forward link 14A and second forward link 14B.

As discussed above, second apertures 18A, 18B are larger than end portions 28 such that with pin 20 fixed in first rear link 14C and second rear link 14D, first forward link 14A and second forward link 14B may pivot relative to pin 20. For example, protrusions 52 of each of first forward link 14A and second forward link 14B pivots on inner faces 38 of respective indented portions 36 of end portions 28. During the pivoting, top extension portion 32 and bottom extension portion 34 may be received within, and may move within, tip portions 46. As such, first forward link 14A and second forward link 14B may pivot relative to first rear link 14C and second rear link 14D as track assembly 10 propels the machine, for example, as track link assembly 10 bends around a pivot or sprocket.

FIG. 5 illustrates track link assembly portion 10A with link subassemblies 12 in a partially pivoted position. As shown, first forward link 14A and second forward link 14B are pivoted relative to first rear link 14C and second rear link 14D. In this aspect, pin 20 is interference fit within portions of first rear link 14C and second rear link 14D with central portion 26 passing through first apertures 16C and 16D of first rear link 14C and second rear link 14D. Furthermore, first forward link 14A and second forward link 14B are coupled to the rear links 14C, 14D with end portions 28 of pin 20 passing through respective second apertures 18A, 18B. As shown, pivoting of first forward link 14A and second forward link 14B relative to first rear link 14C and second rear link 14D causes protrusion 52 to pivot within indented portion 36 and move relative to inner face 38. It is noted that in FIG. 5, first forward link 14A and second forward link 14B are pivoted downward such that top extension portion 32 moves toward the top surface portion 48 and fills the top open portion 50. Similarly, bottom extension portion 34 moves away from the bottom surface portion 48 and retracts from the bottom open portion 50. Moreover, it is noted that pivoting first forward link 14A and second forward link 14B upward would accordingly move bottom extension portion 34 toward the bottom surface portion 48, and bottom extension portion 34 would fill the bottom open portion 50. Similarly, such pivoting would cause top extension portion 32 to move away from the top surface portion 48 and retract from the top open portion 50. Accordingly, the respective sizes and shapes of extension 30 of pins 20 and second aperture 18 of links 14 may help to control the relative pivoting or rotation between pins 20 and the links 14.

INDUSTRIAL APPLICABILITY

The disclosed aspects of track link assembly 10 may be used in any machine that includes a tracked undercarriage that includes links coupled together to form one or more tracks. Track link assembly 10 described herein may provide a strong and durable connection between links 14, with a reduced number of components and lower likelihood of requiring maintenance or replacement. Therefore, the disclosed track link assembly may be reliable and low cost, without sacrificing performance.

Each link 14 includes a first aperture 16 and a second aperture 18, and the links 14 are coupled by pin 20. Pin 20 is fixedly coupled to a first, or inner, link via bearing portion 26, and pin 20 is rotatably or pivotably coupled to a second, or outer, link 14 via end portion 28.

During the operation of the machine, adjacent links 14 of link subassemblies 12 pivot relative to each other. In particular, an outer link of adjacent links 14 is coupled to pin 20 with end portion 28 slip fit through second aperture 18 to allow for relative pivoting. As shown in FIG. 5, the outer link (i.e., second forward link 14B) pivots relative to pin 20 with protrusion 52 contacting indented portion 36. The size and shape of second aperture 18 and end portion 28 allows for the relative pivoting of the outer link and pin 20 in a range of approximately 15 to 30 degrees. For example, the outer link and pin 20 may pivot relative to one another up to 15 degrees in either direction, up to 20 degrees in either direction, up to 25 degrees in either direction, or up to 30 degrees in either direction. Additionally, because link 14 and pin 20 are in pivoting contact, and thus have an overlapping arc length, between protrusion 52 and indented portion 36, an angular velocity between the contact surfaces of link 14 and pin 20 is reduced compared to a larger pivoting contact or a pivoting contact farther radially away from the rotational center of the two elements. As a result, link 14 and pin 20 may pivot relative to one another, and the respective contact surfaces may undergo less frictional forces. The reduced angular velocity may also generate less heat. The arrangement of link 14 and pin 20 may help to minimize galling, as the angular velocity between the components in contact (i.e., protrusion 52 and indented portion 42) is reduced. Accordingly, the arrangement may allow for link 14 and pin 20 to last longer in the operation of track link assembly on the machine, reducing maintenance and/or replacement costs. Moreover, the contact surface configuration between link 14 and pin 20 discussed above may reduce or eliminate a need for lubrication, further reducing maintenance costs.

Pin 20 may also be formed of a single, unitary element. In particular, because pin 20 is interference or press fit within first aperture 16 of link 14, pin 20 is substantially stationary. Conventional track pins include separate bushings and pins that may provide for relative movement, but pin 20 may be a single element, potentially reducing manufacturing costs and/or time. Additionally, pin 20 may be integrally formed (i.e., molded) from, for example, steel. Pin 20 may be heat treated to harden the molded material, and pin 20 may be heated at a hotter temperature and for a longer duration than conventional bushings and/or pins because there is a reduced risk of damaging the connections as pin 20 is a single element. As such, pin 20 may be hardened to a deep depth.

It will be apparent to those skilled in the art that various modifications and variations can be made to the disclosed system without departing from the scope of the disclosure. Other embodiments of the system will be apparent to those skilled in the art from consideration of the specification and practice of the track link assembly with coupled links disclosed herein. It is intended that the specification and examples be considered as exemplary only, with a true scope of the disclosure being indicated by the following claims and their equivalents.

What is claimed is:

1. A track link assembly, comprising
   a plurality of link subassemblies including a first link subassembly and a second link subassembly, wherein each link subassembly includes a pair of links coupled together, wherein each link includes a first aperture and a second aperture, wherein the first aperture of each link is substantially circular, and wherein the second aperture of each link is C-shaped; and
   a pin element pivotably coupling each of the first link subassembly and the second link subassembly, wherein the pin element includes a centrally positioned central portion and end portions on opposite sides of the central portion,
   wherein the central portion of the pin element is configured to pass through the first aperture of a first link in each of the first link subassembly and the second link subassembly, and wherein the end portions are configured to pass through the second apertures of a second link in each of the first link subassembly and the second link subassembly.

2. The track link assembly of claim 1, wherein the central portion is substantially cylindrical, and wherein a cross-sectional diameter of the first apertures is smaller than a cross-sectional diameter of the central portion.

3. The track link assembly of claim 2, wherein the central portion is interference or press fit within the corresponding first aperture.

4. The track link assembly of claim 1, wherein the end portion of each link is slip fit within the corresponding second aperture, and wherein each second aperture includes a protrusion extending toward the end portion.

5. The track link assembly of claim 4, wherein the protrusion forms a rocker arm.

6. The track link assembly of claim 4, wherein the end portion of each link includes an indented portion configured to contact and at least partially receive the protrusion, and wherein during relative rotation of links in each of the first link subassembly and the second link subassembly, the protrusion pivots within the indented portion.

7. The track link assembly of claim 4, wherein the second aperture allows for relative pivoting between the pin element and the link through which the end portion extends of between approximately 15-30 degrees in a clockwise direction and between approximately 15-30 degrees in a counter clockwise direction.

8. The track link assembly of claim 1, wherein the pin element is a single element formed of heat treated steel.

9. The track link assembly of claim 1, wherein each of the links of each link subassembly are coupled in an offset configuration.

10. The track link assembly of claim 1, wherein each of the links includes one or more central holes positioned between the first aperture and the second aperture, and wherein each of the links includes one or more shoe holes configured to couple one or more track shoes to each link.

11. The track link assembly of claim 1, wherein the track link pin includes a ledge portion extending longitudinally between the central portion and each of the one end portions.

12. A track link, comprising:
    a first aperture; and
    a second aperture,
    wherein the first aperture and the second aperture are spaced apart along a longitudinal axis of the track link, wherein the first aperture is circular, and wherein the second aperture is C-shaped formed by a semi-circular portion and two open portions formed by curved surfaces and includes a protrusion between the two open portions that extends toward the semi-circular portion.

13. The track link of claim 12, further including one or more central holes positioned between the first aperture and the second aperture, and
    further including one or more shoe holes configured to couple one or more track shoes to the track link.

14. The track link of claim 12, wherein the protrusion forms a rocker arm.

15. The track link of claim 14, wherein the track link is configured to be coupled to another track link in an offset configuration.

16. A track link component, comprising:
    a track link pin, wherein the track link pin is an integrally formed piece of metal and includes a centrally-positioned central portion and two end portions on opposite sides of the central portion,
    wherein the central portion is cylindrical, and
    wherein each of the end portions includes a C-shaped extension extending longitudinally from the central portion.

17. The track link component of claim 16, wherein the track link pin is formed of heat treated steel.

18. The track link component of claim 16, wherein the track link pin includes a ledge portion extending longitudinally between the central portion and each of the one end portions.

19. The track link component of claim 16, wherein the C-shaped extensions include a semi circular outer face and an indented inner face.

20. The track link component of claim 19, wherein the inner face includes a top extension and a bottom extension portion connected by an indented portion.

* * * * *